(12) United States Patent
Blechinger

(10) Patent No.: US 10,273,090 B2
(45) Date of Patent: Apr. 30, 2019

(54) PORTABLE BULK MATERIAL CONVEYOR WITH ARRANGEMENT FOR POSITIONING DISCHARGE

(71) Applicant: Gordon John Blechinger, Muenster (CA)

(72) Inventor: Gordon John Blechinger, Muenster (CA)

(*) Notice: Subject to any disclaimer, the term of this patent is extended or adjusted under 35 U.S.C. 154(b) by 0 days.

(21) Appl. No.: 15/901,065

(22) Filed: Feb. 21, 2018

(65) Prior Publication Data

US 2018/0237228 A1 Aug. 23, 2018

Related U.S. Application Data

(60) Provisional application No. 62/462,100, filed on Feb. 22, 2017, provisional application No. 62/519,265, filed on Jun. 14, 2017.

(51) Int. Cl.
*B65G 41/00* (2006.01)
*B65G 21/12* (2006.01)
*B65G 33/14* (2006.01)
*B65G 65/32* (2006.01)

(52) U.S. Cl.
CPC .......... *B65G 41/008* (2013.01); *B65G 33/14* (2013.01); *B65G 41/006* (2013.01); *B65G 65/32* (2013.01); *B65G 2201/042* (2013.01)

(58) Field of Classification Search
None
See application file for complete search history.

(56) References Cited

U.S. PATENT DOCUMENTS

| | | | | |
|---|---|---|---|---|
| 3,297,148 A | * | 1/1967 | Andrews | B65G 65/22 198/304 |
| 4,058,198 A | * | 11/1977 | O'Neill | B65G 15/24 198/313 |
| 4,171,040 A | * | 10/1979 | Nickol | B65G 41/008 198/302 |
| 8,584,826 B2 | * | 11/2013 | Smith | B65G 41/008 198/302 |
| 2016/0207715 A1 | | 7/2016 | Allensworth et al. | |

* cited by examiner

*Primary Examiner* — Kavel Singh
(74) *Attorney, Agent, or Firm* — Kyle R. Satterthwaite; Ade + Company Inc.; Ryan W. Dupuis

(57) ABSTRACT

A portable apparatus for transferring bulk material comprises a conveyor which is supported in inclined orientation with its discharge at a higher elevation than its intake. The conveyor is carried on a frame arranged for rolling movement on a support surface, affording the portability of the apparatus. The conveyor is displaceable back and forth relative to the axle assembly in a lateral direction to adjust a position of the discharge of the conveyor in the lateral direction.

10 Claims, 5 Drawing Sheets

PORTABLE BULK MATERIAL CONVEYOR WITH ARRANGEMENT FOR POSITIONING DISCHARGE

This application claims the benefit under 35 U.S.C. 119(e) of U.S. Provisional application Ser. No. 62/462,100 filed 22 Feb. 2017 and U.S. Provisional application Ser. No. 62/519,265 filed 14 Jun. 2017.

FIELD OF THE INVENTION

The present invention relates generally to portable bulk material conveyors such as those used in the agricultural industry to fill a grain bin, and more particularly to such conveyors having an arrangement for adjusting position of the discharge.

BACKGROUND

Portable bulk material conveyors such as those used in the agricultural industry to fill a grain bin, and thus which may also be known as bin-loading conveyors or as grain augers, may be equipped so as to adjust a position of the discharge without displacing the whole of the conveyor so that it remains fixed in location.

For example, U.S. Pat. No. 4,171,040 to Nickol describes shifting the elevated end of a loading auger by deploying a central wheel that lies at ninety degrees to the two wheels of the frame axle, whereby lowering of this center wheel allows the operator to manually push the auger to one side, thus pivoting the elevated output end about the ground-level input end.

In another example, U.S. Patent Application Publication 2016/0207715 discloses lateral shifting of the output end of the loading auger by using an actuator controlled linkage to raise or lower one of the two main wheels of the auger frame. Thus this tilts the frame to one side, causing a lateral shift of the elevated output end of the auger. While using purely hydraulic control and requiring no manual input as compared to Nickol above, this tilting also causes a slight rolling action on the auger tube, whereby the auger outlet no longer points straight down. This product is commercially available under the trade name Auger Ace from Yetter Manufacturing Company.

SUMMARY OF THE INVENTION

According to an aspect of the invention there is provided a portable apparatus for transferring bulk material comprising:

a conveyor having an intake for receiving the bulk material and having a discharge at an elevation greater than the intake and spaced therefrom in a longitudinal direction of the conveyor along which the bulk material is transferred;

the conveyor being mounted on a frame which is arranged for rolling movement on a support surface;

the frame including upstanding members depending from the conveyor to an axle assembly defining a wheel axis oriented in a lateral direction transverse to the conveyor, the axle assembly supporting one of two wheels at either end for rotational motion about the wheel axis;

the conveyor being displaceable back and forth relative to the axle assembly in the lateral direction to adjust a position of the discharge of the conveyor in the lateral direction.

In such an arrangement, the position of the discharge may be adjusted by shifting a whole of the conveyor in the lateral direction and maintaining the conveyor discharge opening in a common direction, typically opening or pointing vertically downwardly.

Preferably the axle assembly forms a track extending along the wheel axis and there is provided a carrier to which the conveyor is held in fixed relation and that is driven for displacement along the track lying along the wheel axis.

In another arrangement the track may not lie along the wheel axis and may be, for example, spaced above the wheel axis.

Typically the upstanding members of the frame are fixed to the carrier so that the conveyor is fixed in relation to the carrier.

In one arrangement the axle assembly comprises at least one inner member to which the wheels are coupled and defining the track, an outer tube defining the carrier arranged to encompass the at least one inner member circumferentially of the wheel axis, and a cylinder actuator having a first end coupled in fixed location to said at least one inner member and an opposite second end which is movable relative to the first end and that is coupled in fixed location to the outer tube for displacing the carrier along the track.

In one arrangement there are provided a pair of cylinder actuators for driving the carrier in movement along the track where each one of said pair is coupled at one end thereof in fixed location relative to a respective one of the wheels and an opposite end is coupled in fixed location to the carrier, the pair of cylinder actuators being configured for cooperative actuation in a shifting mode such that the carrier is displaceable along the track by operating the pair of cylinder actuators in opposing working directions where one of the pair is retracted while the other one of the pair is extended.

Each one of the wheels may be supported on a different axle member movable relative to the other so that a width of the axle assembly is adjustable between a transport width for transporting the portable apparatus along a roadway and a working width when the portable apparatus is operated to convey the bulk material.

In such an arrangement, typically the pair of cylinder actuators are cooperatively interconnected so that alternate portions are connected to a common flow.

Further, in such an arrangement, one of a set of the alternate portions being may be communicated with the common flow by a valve, the valve being positionable in a first position corresponding to the shifting mode and in a second position so that a corresponding one of the cylinder actuators is locked in position with fixed length while the other one of the cylinder actuators is operable such that the width of the axle can be adjusted.

In another arrangement the pair of cylinder actuators may be cooperatively interconnected so that common portions of the cylinder actuators are connected to a common flow so that in a deployment mode the axle members are movable in opposite directions along the wheel axis for adjusting the width of the axle by operating both of the cylinder actuators in a common working direction.

In a further arrangement, the pair of cylinder actuators are operatively interconnected with inner ends at the carrier having a common flow so that a series fluidic circuit is formed from an outer end of a first one of the pair of cylinder actuators through the common flow to an outer end of a second one of the pair of cylinder actuators. As such, in the shifting mode, input flow to one of the outer ends acts to displace fluid from the other one of the outer ends.

Preferably the outer ends of the pair of cylinder actuators are formed by piston rod side chambers of the cylinder actuators.

In some arrangement, in the shifting mode, the pair of cylinder actuators are driven with input flow at their piston rod side chambers.

Typically the axle assembly extends linearly of the wheel axis between the wheels.

According to an aspect of the invention there is provided a method of adjusting a discharge position of a portable bulk material transfer apparatus, said method comprising shifting a conveyor of the apparatus relative to a wheeled frame on which said conveyor is carried in a lateral direction transverse to a longitudinal direction of said conveyor.

BRIEF DESCRIPTION OF THE DRAWINGS

Embodiments of the invention will now be described in conjunction with the accompanying drawings in which.

In the drawings like characters of reference indicate corresponding parts in the different figures.

DETAILED DESCRIPTION

Figure 1:
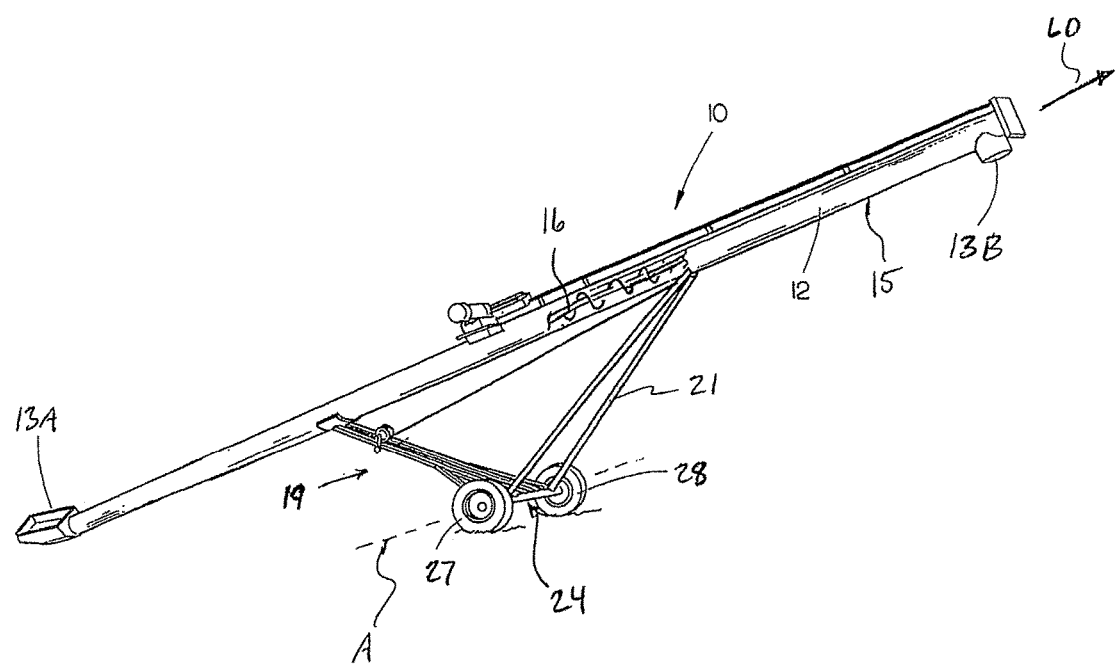
FIG. 1 illustrates a portable apparatus for transferring bulk material according to the present invention.

The accompanying figures show a portable apparatus 10 for transferring bulk material, which typically is also particulate, such as grain, from one location to another. Such an apparatus is commonplace in the agricultural industry for example for loading grain into a bin 1 which has an inlet fill opening 2 spaced above the ground.

The apparatus 10 thus includes a conveyor 12 having an intake 13A for receiving the bulk material and having a discharge 13B wherefrom the material exits the conveyor at an elevation greater than the intake and at a spaced location from the intake in a longitudinal direction LO of the conveyor along which the bulk material is transferred.

The conveyor 12 of the illustrated embodiment is an arrangement conventional to the agricultural industry comprising a tubular housing 15 extending in the longitudinal direction LO of the conveyor. Inside the housing 15 there is carried a conveying member such as an auger 16 (partially schematically illustrated through the housing) extending longitudinally of the conveyor that is driven to convey the bulk material from the intake 13A to the discharge 13B. The conveyor 12 operates in a conventional manner understood by a person skilled in the art is therefore not described in detail herein.

The conveyor 12 is mounted on a frame 19 arranged for rolling movement on a support surface, such as the ground. As such, the frame 19 includes upstanding members 21 depending downwardly from the conveyor 12 to an axle assembly 24 defining a wheel axis A which is oriented in a lateral direction LA transverse to the conveyor 12. The axle assembly 24 extends linearly of the wheels axis and supports one of two wheels 27, 28 at either end thereof for rotational motion about the wheel axis A. By the frame 19, the conveyor 12 is normally held in inclined orientation, and the axle assembly 24 allows for the conveyor to be moved or transported from one site to the next on a common field or down a roadway.

Figure 5:
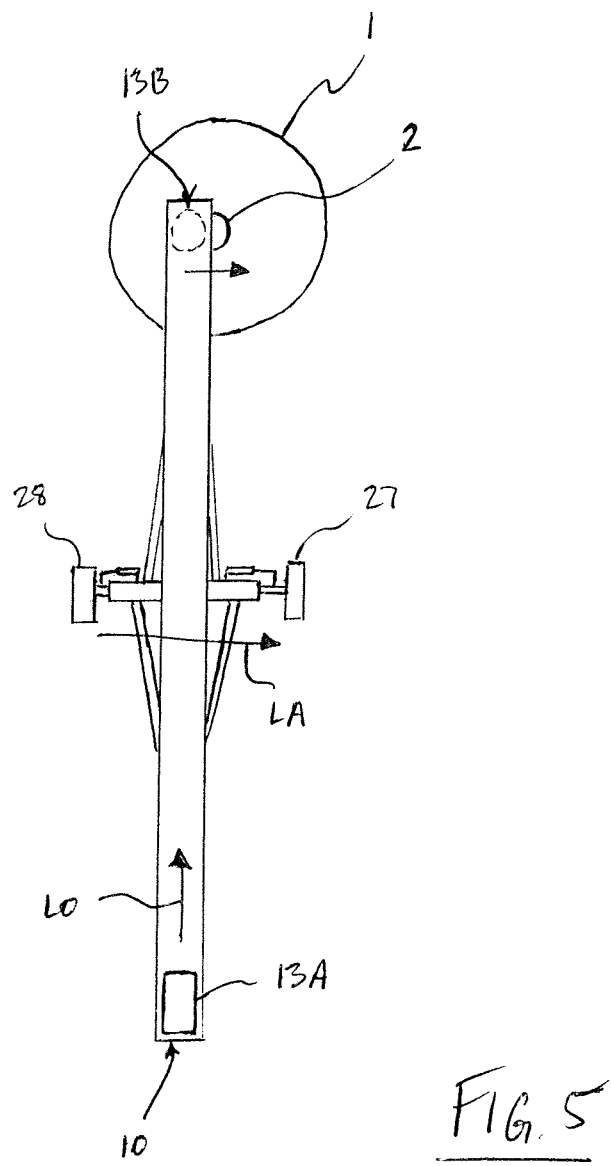
FIG. 5 is a schematic illustration showing a top plan view of the portable apparatus in use.

In example use in an agricultural setting as illustrated in FIG. 5, the conveyor discharge 13B is aligned with the fill opening 2 of the grain bin 1 so that the bulk material can be transferred into the grain bin 1 in a manner minimizing spillage where the bulk material falls to the outside of the bin 1. This alignment may be challenging given that a conveyor apparatus of this type has a relatively large length from intake 13A to discharge 13B.

Thus the apparatus 10 includes a track and carrier arrangement which allows the conveyor 12 to be shifted in the lateral direction LA to adjust position of the discharge 13B in the lateral direction LA.

Figure 2:
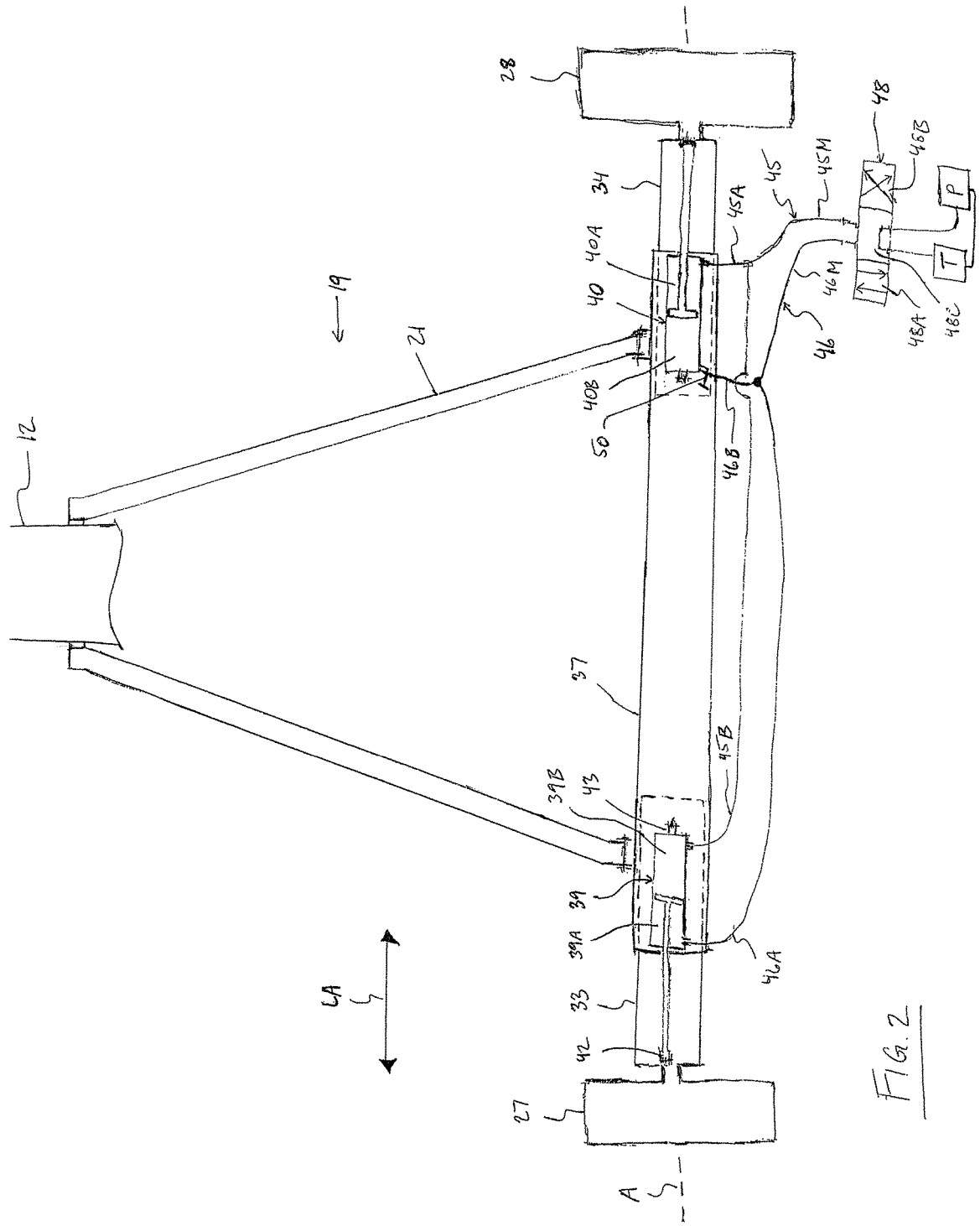
FIG. 2 is a schematic illustration showing an enlarged front portion of a first embodiment of portable apparatus according to the present invention.
Figure 3:
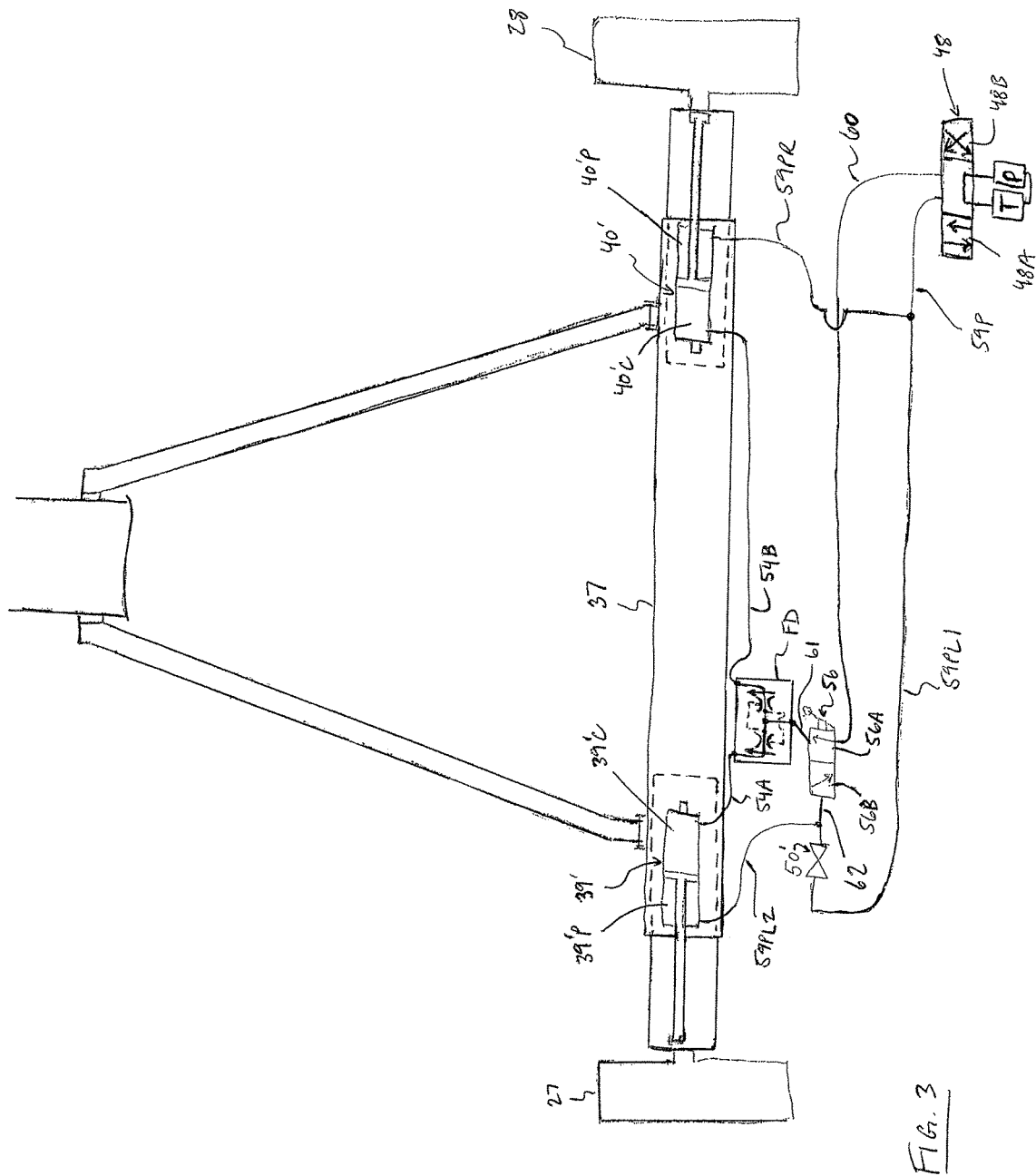
FIG. 3 is a schematic illustration showing an enlarged front portion of a second embodiment of portable apparatus according to the present invention.
Figure 4:
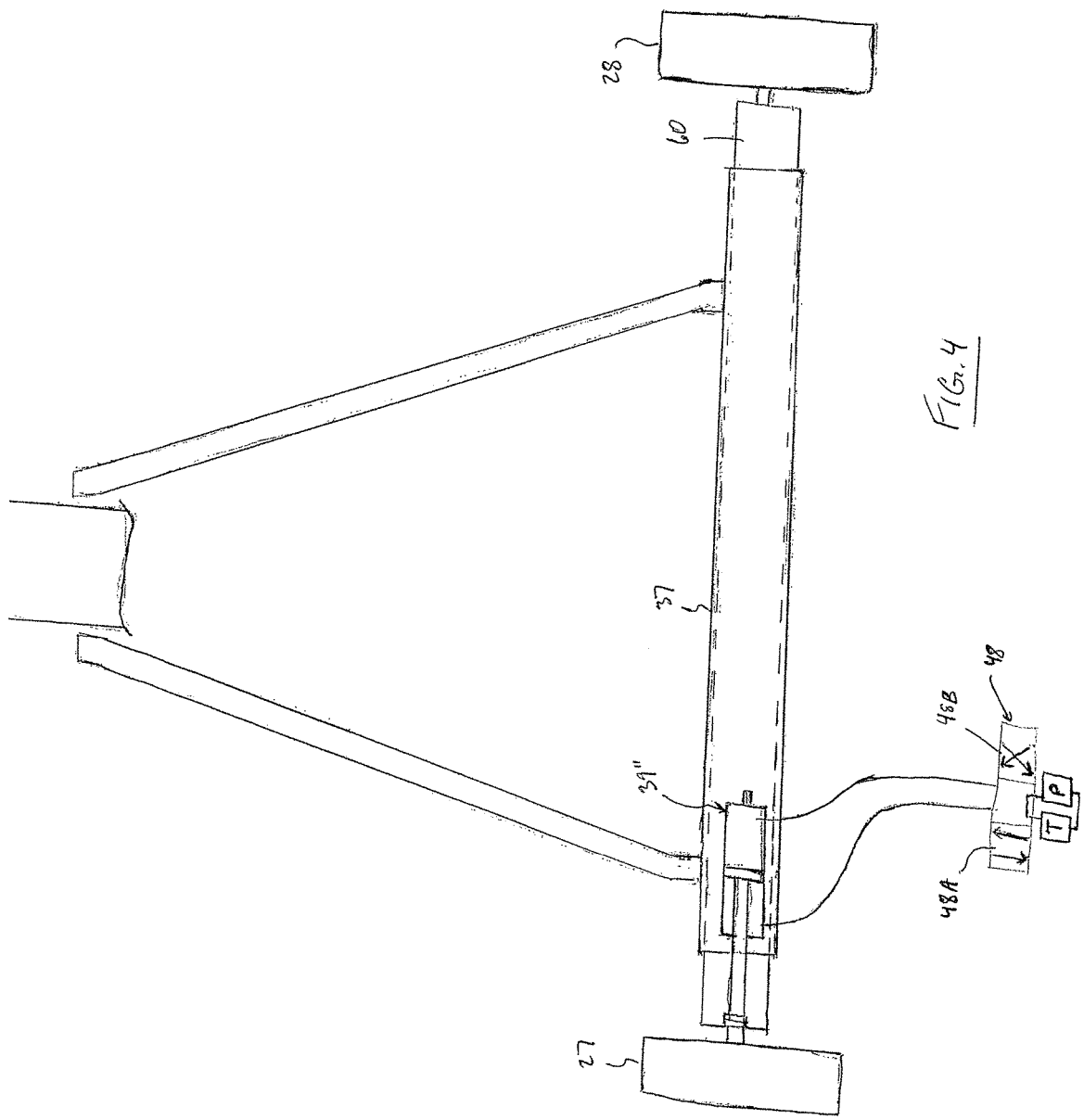
FIG. 4 is a schematic illustration showing an enlarged front portion of a third embodiment of portable apparatus according to the present invention.

More specifically, and referring to FIGS. 2-4, in the illustrated embodiment the axle assembly 24 forms the track which extends along the wheel axis A so as to be coaxial therewith.

Forming this track are a pair of inner axle members 33, 34 of the axle assembly, each of which is coupled to one of the wheels 27, 28. As such, each wheel is supported on a different axle member which is arranged to be movable relative to the other so that a width of the axle assembly in the lateral direction LA is adjustable between a transport width for transporting the portable apparatus along a roadway and a working width when the portable apparatus is operated to convey the bulk material. In an arrangement having fixed axle width, the wheels 27, 28 may be attached to a single common inner axle member.

The axle assembly also includes an outer tube 37 defining the carrier that encompasses the inner axle members 33, 34 circumferentially of the wheel axis A so that the inner axle members are receivable in the outer tube. The upstanding members 21 of the frame are attached to the outer tube in a manner so that the conveyor 12 is fixed in relation to the carrier 37, so that when the carrier is driven for displacement along the track the conveyor is displaced therewith.

Driving the carrier 37 in movement along the track are a pair of cylinder actuator 39, 40, one located at each end of the carrier. Each cylinder has a first actuator end 42 coupled in fixed location to a respective one of the inner axle members 33, 34 so as to be in fixed location with respect to the respective wheel rotatably supported thereby, and an opposite second actuator end 43 coupled in fixed location to the outer tube 37 and which is movable relative to the first end 42. In the illustrated embodiment the cylinder actuators 39, 40 are pivotally coupled at their piston rod ends 42 to the inner axle members and at their cylinder barrel ends 43 to the outer tube. Furthermore, in such an arrangement each cylinder actuator is located at one side of the apparatus 10 and coupled to the carrier adjacent that end of the carrier 37 which is closest to the respective wheel on the corresponding side of the apparatus. That is, cylinder actuator 39 is located on the side of the apparatus on which wheel 27 is disposed so as to be that one of the cylinder actuators adjacent thereto, and cylinder actuator 40 is located on that side of the apparatus on which wheel 28 is disposed so as to be the cylinder actuator adjacent thereto. For ease of reference herein, the side of the apparatus with wheel 27 may be referred to as a left side of the apparatus and that side with wheel 28 may be referred to as a right side of the apparatus.

In other arrangements a single cylinder actuator may be provided, for example if there is a single inner axle member supporting both wheels, for displacing the outer tube axially of the single inner axle member.

The cylinder actuators 39, 40 are cooperatively actuated so as to displace the conveyor 12 back and forth relative to the axle assembly 24 in the lateral direction LA to adjust the position of the conveyor discharge 13B in the lateral direction. As such, the cylinder actuators are configured for cooperation in a shifting mode in which the carrier is displaceable along the track by operating the pair of cylinder actuators in opposing working directions where one of the pair is retracted while the other one of the pair is extended. Furthermore, the cylinder actuators are cooperatively actuated in a deployment mode to adjust the width of the axle assembly between transport and working widths.

In a first embodiment shown in FIG. 2, the cylinder actuators 39, 40 are operatively interconnected using first and second hydraulic lines 45, 46 which connect together alternate portions of the cylinder actuators, chamber 39A with that at 40B and chamber 39B with that at 40A, so that these alternate portions are arranged in parallel connected to a common flow of fluid so as to be enabled to simultaneously receive hydraulic fluid or simultaneously have hydraulic fluid removed therefrom. Each cylinder actuator comprises a first chamber 39A, 40A formed on a piston rod side of the piston, and a second chamber 39B, 40B formed on a cap side of the piston which is adjacent the cylinder barrel end 43.

The hydraulic lines 45, 46 guide the hydraulic fluid to and from a pump/tank arrangement which includes pump P delivering the fluid to the cylinder actuators and reservoir or tank T containing the fluid and wherefrom the pump P draws the fluid for pumping through the system of cylinder actuators.

A selector valve 48 is provided with at least two operating positions for communicating the pump and tank arrangement with the cylinder actuators 39, 40. In a first one of the operating positions indicated schematically by 48A, the pump P is communicated with hydraulic line 45 which connects to the first rod side chamber 40A of cylinder actuator 40 and the second cap side chamber 39B of cylinder actuator 39 and the tank T is communicated with hydraulic line 46 which connects to the second cap side chamber 40B of cylinder actuator 40 and the first rod side chamber 39A of cylinder actuator 39. In a second one of the operating positions indicated schematically at 48B, the connection of the first operating position is reversed or crossed-over such that now the pump P is communicated with hydraulic line 46 and the tank T with hydraulic line 45. There may also be a third position 48C in which the pump and tank are not communicated with the hydraulic lines 45, 46.

Extending away from the selector valve 48 is a first primary portion of the hydraulic lines 45M and 46M each of which respectively diverges to form a set of branches 45A and 45B or that of 46A and 46B. More specifically, in regard to hydraulic line 45 a right-side branch 45A connects to the first rod side chamber 40A of cylinder actuator 40 and a left-side branch 45B connects to the second cap side chamber 39B of cylinder actuator 39. In regard to hydraulic line 46, a left-side branch 46A connects to the first rod side chamber 39A of cylinder actuator 39 and a right-side branch 46B connects to the second cap side chamber 40B of cylinder actuator 40.

There is also provided a shut-off valve 50 in the right-side branch 46B of second hydraulic line 46 which is positionable in an open position so that hydraulic fluid can flow to and from the second cap side chamber 40B of right-side cylinder actuator 40, and in a closed position whereby this flow is obstructed thereby effectively locking the right-side cylinder actuator 40 in position with fixed length. As such, the shut-off valve communicates one chamber of a set of the interconnected alternate portions (alternate chambers) of the cylinder actuators, in this case that at 40B of interconnected set comprising chambers 39A and 40B, with the interconnected set's common flow of hydraulic fluid.

To shift the conveyor discharge 13B laterally towards that side of the apparatus corresponding to the wheel 28 (that is, a first side which is also referred to as the right side), the selector valve 48 is positioned in the first operating position 48A so that hydraulic fluid is delivered by the pump P to first hydraulic line 45 and transferred from second hydraulic line 46 to the tank T. The shut-off valve 50 is in the open position so that fluid can flow into/out of the cap side chamber 40B of the right-side cylinder actuator 40. Thus, hydraulic fluid fills the rod side chamber 40A of the right-side cylinder actuator and cap side chamber 39B of the left-side cylinder actuator, and hydraulic fluid is evacuated from the cap side chamber 40B of the right-side cylinder actuator and rod side chamber 39A of the left-side cylinder actuator. By this flow of hydraulic fluid both cylinder actuators act to operate in opposite working directions with the right-side cylinder actuator 40 retracting while the left-side cylinder actuator 39 is extending so as to displace or shift the carrier 37 in a lateral direction from wheel 27 towards wheel 28, or in other words in a right lateral direction.

In order to shift the conveyor discharge 13B laterally towards that side of the wheel 27 (that is, a second side which is also referred to as the left side), the selector valve 48 is positioned in the second operating position 48B so that hydraulic fluid is delivered by the pump P to the second hydraulic line 46 and transferred from the first hydraulic line 45 to the tank T. The shut-off valve 50 is in the open position. Thus, hydraulic fluid fills the rod side chamber 39A of the left-side cylinder actuator and cap side chamber 40B of the right-side cylinder actuator, and hydraulic fluid is evacuated from the cap side chamber 39B of the left-side cylinder actuator and rod side chamber 40A of the right-side cylinder actuator. By this flow of hydraulic fluid both cylinder actuators still act to operate in opposite working directions but now with the left-side cylinder actuator 39 retracting while the right-side cylinder actuator 40 is extending so as to displace or shift the carrier in a lateral direction from wheel 28 towards wheel 27, or in other words in a left lateral direction.

Thus, it will be appreciated that for the shifting mode the shut-off valve 50 remains in the open position.

Furthermore, it will be appreciated that in all lateral positions of the conveyor with respect to the axle assembly, the conveyor discharge 13B is pointed in a common radial direction relative to the longitudinal direction LO along which material is conveyed. Also, the wheels 27, 28 can be maintained in fixed location in the shifting mode for adjusting the position of the discharge.

In order to adjust the width of the axle assembly 24 between transport and working widths, the apparatus 10 of the illustrated embodiment is operated according to a two-step approach for setting the axle assembly to each of the transport width and the working width which is typically larger than the transport width. In the transport width, typically the inner axle members will be maximally retracted into the outer tube 37 so as to minimize the width of the axle assembly, which in the illustrated embodiment is when the respective inner axle member projects a minimal distance axially beyond an end of the outer tube.

This two-step approach for decreasing the width of the axle assembly towards the reduced transport width includes:

1) Shifting the conveyor towards the first or right side of the apparatus, that is towards the side on which the wheel 28 is, in the shifting mode, as described previously. Typically the conveyor is positioned as closest possible to the right-side wheel 28 for the transport width.

2) Positioning the shut-off valve 50 in the closed position and the selector valve 48 in the second operating position 48B so that the cylinder actuator 39 on the second/left side of the apparatus is retracted while the cylinder actuator 40 on the first/right side of the apparatus is in a locked condition preventing extension thereof due to the closure of chamber 40B by shut off valve 50.

The two-step approach for increasing the width of the axle assembly towards the expanded working width includes:

1) Shifting the conveyor 12 towards the second or left side of the apparatus, that is towards the side on which the wheel 27 is, in the shifting mode, as described previously.

2) Positioning the shut-off valve 50 in the closed position and the selector valve 48 in the first operating position 48A so that the second/left side cylinder actuator 39 is extended while the first/right side cylinder actuator 40 is in locked condition preventing retraction thereof due to the closure of chamber 40B by shut off valve 50.

In an alternative embodiment shown in FIG. 3, a pair of cylinder actuators 39' and 40' are operatively interconnected with inner ends at the carrier 37, which are formed by common portions thereof, more specifically cap side chambers 39'C and 40'C, having a common flow provided by hydraulic lines 54A and 54B which are interconnected and thus fluidically communicated by flow divider FD. Thus is formed a series fluidic circuit from an outer end of the first cylinder actuator 39', which is formed by its piston rod side chamber 39'P, through the common flow lines 54A, 54B to an outer end of the second cylinder actuator 40 formed by its piston rod side chamber 40'P. Thus, in the shifting mode only one of the two outer ends of the cylinder actuators 39', 40' can be driven and both cylinder actuators operated in order to shift the carrier 37 in one direction along the track.

In the second embodiment of FIG. 3, the pair of cylinder actuators 39', 40' are operatively coupled to a pump/tank arrangement P and T via a three-way intermediary selector valve 56, which is connected to the flow divider FD so as to be fluidically communicated with the common flow provided by lines 54A, 54B at a location intermediate of the inner ends of the cylinder actuators, and a shut-off valve 50' which is operated in a cooperative manner with the intermediary selector valve 56 so as to provide both the shifting mode and the deployment mode for adjusting between transport and working widths.

That is, the shut-off valve 50' is located in series in a closed loop formed by the outer ends of the cylinder actuators whereat the piston rod side chambers are located, the inner ends whereat the cap side chambers are located, and the common flow provided by lines 54A, 54B intermediate the inner ends. Thus, hydraulic line 59P extends away from selector valve 48 and diverges to form a pair of branches, one of which is collectively formed by hydraulic lines 59PL1 and 59PL2 and the other indicated at 59PR, each of which generally lead to a piston rod side chamber of one of the cylinder actuators 39', 40'. In one of these branches, indicated collectively by 59PL1 and 2 in the illustrated embodiment, is located the shut-off valve 50' at a location between a junction of the branches at line 59P and a cylinder actuator 39'. Thus, the closed loop mentioned previously is formed by hydraulic lines 59PL1 and 2 which are connected by the shut-off valve 50', the cylinder actuator 39', the common flow lines 54A, 54B, the cylinder actuator 40', and hydraulic line 59PR.

The common flow provided by lines 54A, 54B is connected to the pump/tank arrangement P and T via fluidic path formed collectively by hydraulic lines 60 and 61, which are connected through the intermediary selector valve 56.

The junction of the common flow lines 54A, 54B and the hydraulic line 61 connecting the former to the intermediary selector valve 56 is formed by the flow divider FD which provides equivalent pressure along either branch of the common flow, that is along lines 54A and 54B respectively between the flow divider FD and the base end of the respective actuator 39', 40', when fluid is delivered through the common flow upon deploying the apparatus to the wider-stance operating mode. This allows the piston rods of the actuators 39', 40' to extend uniformly in movement into the operating mode.

In arrangements where there is no flow divider the common flow can be provided by a single hydraulic line which is operatively connected the hydraulic line 61.

At the intermediary selector valve 56 is provided a bridging hydraulic line 62 which connects to hydraulic line 59PL downstream of the shut-off valve 50', with respect to the pump/tank arrangement P and T, so as to be intermediate the shut-off valve and the cylinder actuator 39'. This hydraulic line 62 connects and bridges the closed loop fluidic circuit providing the shifting mode and the hydraulic line The three-way intermediary selector valve 56 is a conventional three-way valve which is positionable in two operating positions so as to connect a common port with one of two other ports. In a first operating position 56A of the intermediary valve, hydraulic lines 60 and 61 are communicated so that the pump/tank arrangement is communicated with the common flow lines 54A, 54B. In a second operation position 56B, hydraulic lines 59PL2 and 60 are communicated along bridging line 62, in which case the common flow provided by lines 54A, 54B is disconnected from the pump-tank arrangement P and T.

As previously mentioned, the intermediary selector valve 56 is operated in conjunction with the shut-off valve 50' to change between shifting and deployment modes of the apparatus. This is achieved in the following manner:

Positioning the shut-off valve 50' in an open position, such that hydraulic lines 59PL1 and 2 are communicated, and the three-way intermediary valve 56 in the first position 56A provides the deployment mode. Depending upon the position of the selector valve 48 adjacent the pump/tank arrangement P and T, hydraulic fluid is delivered either to the inner ends of the cylinder actuators 39', 40' to increase the width of the axle assembly towards the working width, or to the outer ends of the cylinder actuators to decrease the width of the axle assembly towards the transport width.

Positioning the shut-off valve 50' in a closed position, such that hydraulic lines 59PL1 and 2 are not communicated, and the three-way intermediary valve 56 in the second position 56B provides the shifting mode. Thus, the common flow provided by lines 54A, 54B acts as a transfer or equalizer line between the cap side chambers 39'C, 40'C of the actuators forming the inner ends, and rod side chambers 39'P, 40'P act as inputs to which hydraulic fluid is fed by the pump/tank arrangement so as to shift the carrier 37 in one lateral direction or the other. Providing an input flow to the rod side chambers in the shifting mode may reduce pressure spikes within the cylinder actuators as compared to using the cap side chambers therefor. More specifically, positioning the selector valve 48 in the first position 48A allows for the carrier to be displaced towards the left-side wheel 27, and in the second position 48B the carrier can be displaced towards the right-side wheel 28.

FIG. 4 shows a third embodiment having a single cylinder actuator 39" and a single common inner axle member 65 with fixed width on which the wheels 27, 28 are rotatably supported. The cylinder actuator 39" is located at one side of the apparatus connected to the single axle member 65 at a fixed location to the wheels but closer to one wheel 27 than the other 28, and at the carrier 37 adjacent that end of the carrier closest to the wheel 27 nearest which the single cylinder actuator is coupled. In this embodiment the cylinder actuator is operable only in the shifting mode so as to displace the carrier along the track. A pump/tank arrangement P and T is operatively coupled to the single cylinder actuator 39" via selector valve 48 to drive movement in the shifting mode, and selector valve operating positions 48A and 48B alone allow flow to the cylinder actuator to be controlled for shifting from one side to the other in each opposite lateral direction. That is, in one operating position the pump P is fluidically communicated with one chamber of the cylinder actuator and in the other operating position pump P is fluidically communicated with the opposite chamber, and the remaining chamber in either operating position is fluidically communicated with the tank T so as to form a closed fluidic circuit for driving shifting movement.

The scope of the claims shall not be limited by the preferred embodiments set forth in the examples, but shall be given the broadest interpretation consistent with the description as a whole.

The invention claimed is:

1. A portable apparatus for transferring bulk material comprising:
    a conveyor for transferring the bulk material generally in a longitudinal direction, the conveyor having an intake for receiving the bulk material and a discharge disposed at an elevation greater than the intake and spaced therefrom generally in the longitudinal direction;
    a frame supporting the conveyor for rolling movement across a support surface so that the conveyor is movable from one location to another;
    the frame including an axle assembly disposed under the conveyor and defining a wheel axis;
    the wheel axis being oriented in a lateral direction transverse to the longitudinal direction;
    the axle assembly supporting one of two wheels at either end of the axle assembly for rotational motion about the wheel axis;
    the frame defining a track extending parallel to the wheel axis between the wheels;
    the frame including a movable carrier operably coupled to the track and operable to move in the lateral direction along the track;
    the carrier also being coupled to the conveyor so as to interconnect the conveyor and the track so that the conveyor including the intake and the discharge is displaceable in the lateral direction along the track to adjust a position of the discharge of the conveyor relative to the lateral direction.

2. The portable apparatus according to claim 1 wherein the axle assembly forms the track such that the track lies along the wheel axis.

3. The portable apparatus according to claim 2 wherein the axle assembly comprises at least one inner member to which the wheels are coupled and which defines the track, an outer tube defining the carrier arranged to encompass said at least one inner member circumferentially of the wheel axis, and a cylinder actuator having a first end coupled in fixed location to said at least one inner member and an opposite second end of the cylinder actuator which is movable relative to the first end and which is coupled in fixed location to the outer tube, the cylinder actuator being driven for displacing the carrier along the track.

4. The portable apparatus according to claim 1 wherein there are provided a pair of cylinder actuators for driving the carrier in movement along the track where each one of said pair is coupled at one end thereof in fixed location relative to a respective one of the wheels and an opposite end is coupled in fixed location to the carrier, the pair of cylinder actuators being configured for cooperative actuation in a shifting mode such that the carrier is displaceable along the track by operating the pair of cylinder actuators in opposing working directions where one of the pair is retracted while the other one of the pair is extended.

5. The portable apparatus according to claim 4 wherein each one of the wheels is supported on a different axle member movable relative to the other so that a width of the axle assembly is adjustable between a transport width for transporting the portable apparatus along a roadway and a working width when the portable apparatus is operated to convey the bulk material, and wherein the pair of cylinder actuators are operatively interconnected so that alternate portions of the pair are connected to a common flow, one of a set of the alternate portions being communicated with the common flow by a valve, the valve being positionable in a first position corresponding to the shifting mode and in a second position so that a corresponding one of the cylinder actuators is locked in position with fixed length while the other one of the cylinder actuators is operable such that the width of the axle can be adjusted.

6. The portable apparatus according to claim 4 wherein the pair of cylinder actuators are operatively interconnected with inner ends at the carrier having a common flow so that a series fluidic circuit is formed from an outer end of a first one of the pair of cylinder actuators through the common flow to an outer end of a second one of the pair of cylinder actuators, such that in the shifting mode input flow to one of the outer ends acts to displace fluid from the other one of the outer ends.

7. The portable apparatus according to claim 6 wherein the outer ends of the pair of cylinder actuators are formed by piston rod side chambers of the cylinder actuators.

8. The portable apparatus according to claim 4 wherein, in the shifting mode, the pair of cylinder actuators are driven with input flow at their piston rod side chambers.

9. A method of using a portable apparatus to transfer bulk material from a first location to a second location, the portable bulk material transfer apparatus including:
    a conveyor having an intake for receiving the bulk material and having a discharge spaced therefrom in a longitudinal direction of the conveyor along which the bulk material is transferred;
    a wheeled frame on which said conveyor is carried, a first one of the wheels being located on one side of the conveyor and a second one of the wheels on the other side thereof such that the conveyor is disposed laterally therebetween;
    the conveyor being mounted on the wheeled frame in a manner so as to be movable relative thereto in a lateral direction from said one side to the other side;
    the method comprising:
    locating the wheeled frame of the portable apparatus at an operating location such that the intake of the conveyor is in proximity to the first location and the discharge of the conveyor is in proximity to the second location so that the bulk material can be transferred by the conveyor from the first location to the second location; and shifting the conveyor including the discharge and the intake relative to the wheeled frame in the lateral direction while the wheeled frame remains fixed in location at the operating location, so as to align the discharge of the conveyor with the second location.

10. A portable apparatus for transferring bulk material comprising:

a conveyor for transferring the bulk material generally in a longitudinal direction, the conveyor having an intake for receiving the bulk material and a discharge disposed at an elevation greater than the intake and spaced therefrom generally in the longitudinal direction;

a frame supporting the conveyor for rolling movement on a support surface so that the conveyor is movable from one location to another;

the frame including an axle assembly disposed under the conveyor and defining a wheel axis which is oriented in a lateral direction transverse to the longitudinal direction of the conveyor;

the axle assembly supporting one of two wheels at either end of the axle assembly for rotational motion about the wheel axis;

the axle assembly forming a laterally extending track for guiding movement of the conveyor in the lateral direction;

the axle assembly further including:

at least one inner member to which the wheels are coupled;

an outer tube encompassing said at least one inner member circumferentially of the wheel axis so as to be coupled thereto;

said at least one inner member defining the track;

the outer tube defining a movable carrier operably coupled to the track for movement therealong;

a cylinder actuator having a first end coupled in fixed location to said at least one inner member and an opposite second end of the cylinder actuator which is movable relative to the first end and which is coupled in fixed location to the outer tube, the cylinder actuator being driven for displacing the carrier along the track;

and the outer tube being connected to the conveyor so that the conveyor including the intake and the discharge is displaceable along the track for the movement in the lateral direction to adjust a position of the discharge of the conveyor in the lateral direction.

* * * * *